March 7, 1967  N. T. GENERAL  3,307,428
HYDROKINETIC POWER TRANSMISSION MECHANISM
HAVING A REVERSIBLE FLOW CONVERTER
Filed Dec. 30, 1963  3 Sheets-Sheet 3
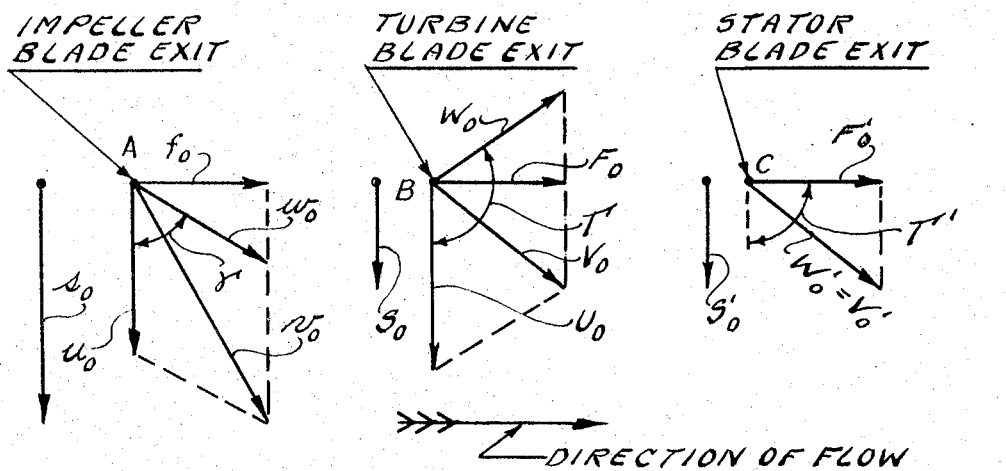
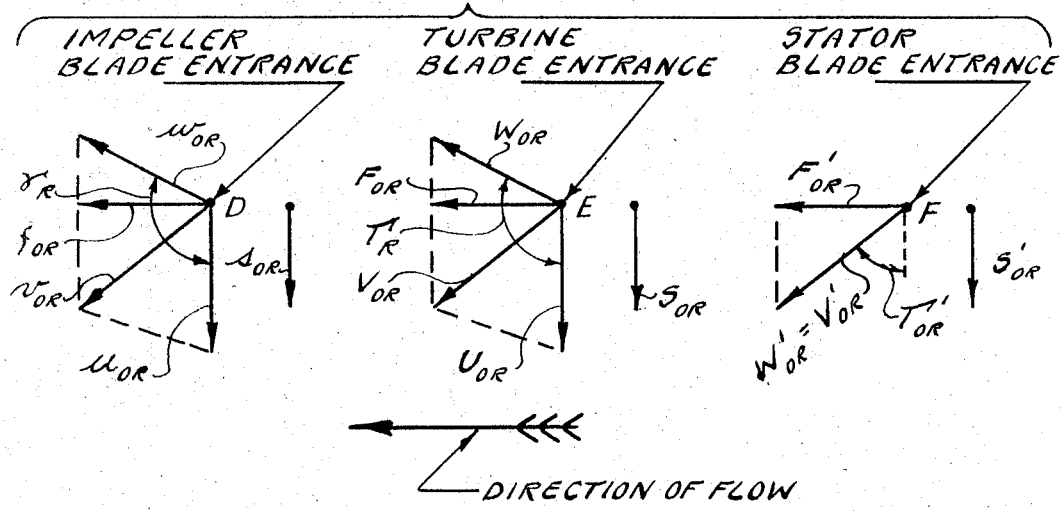
INVENTOR:
NORMAN T. GENERAL
BY
ATTORNEYS.

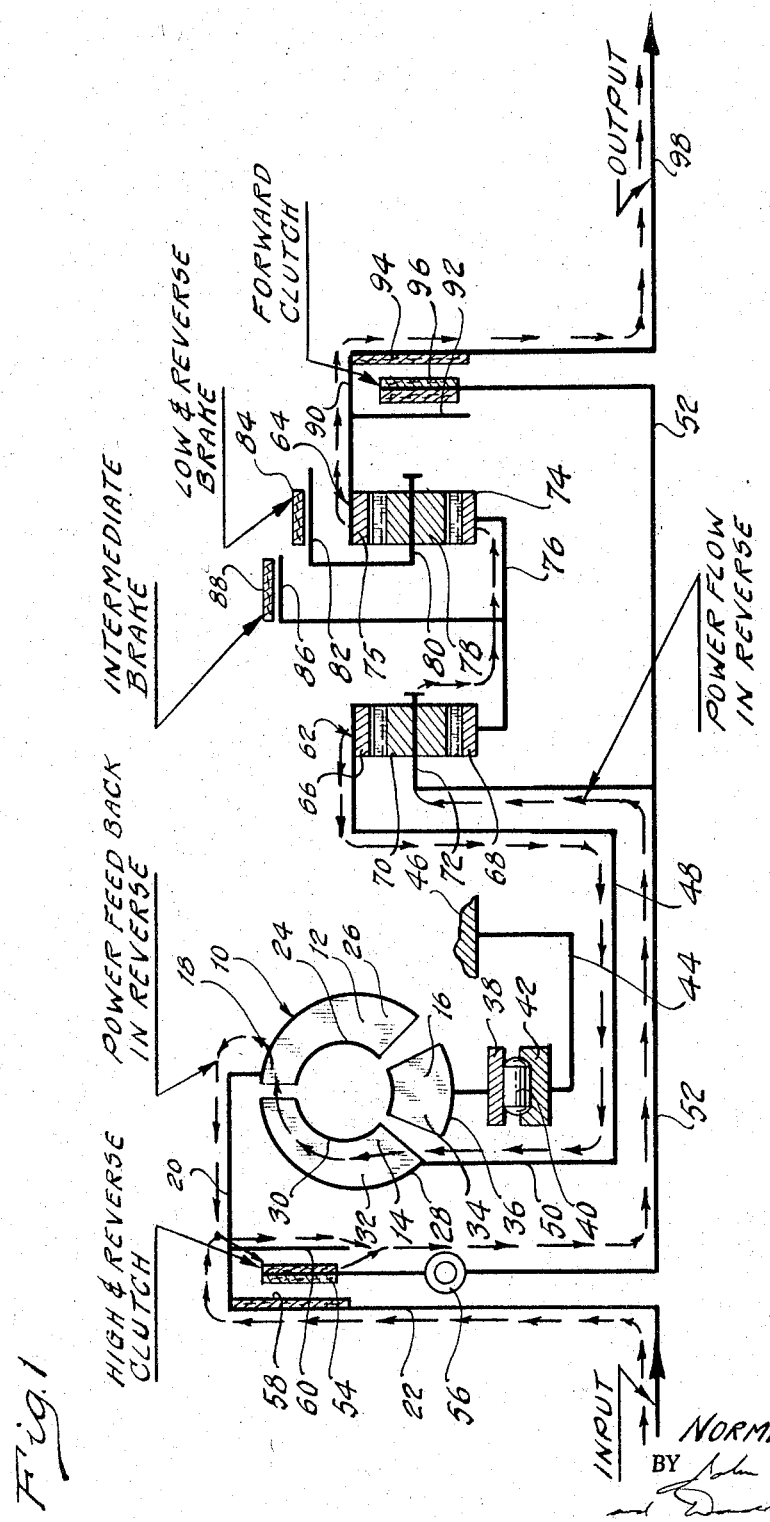

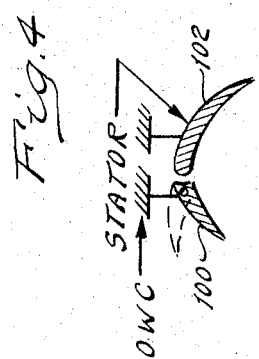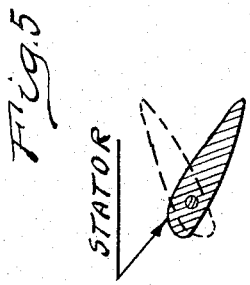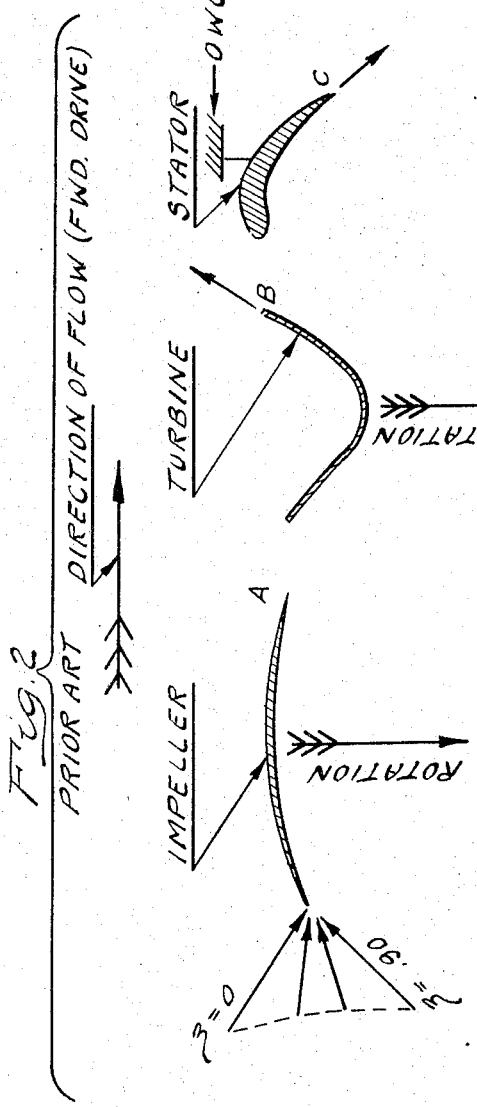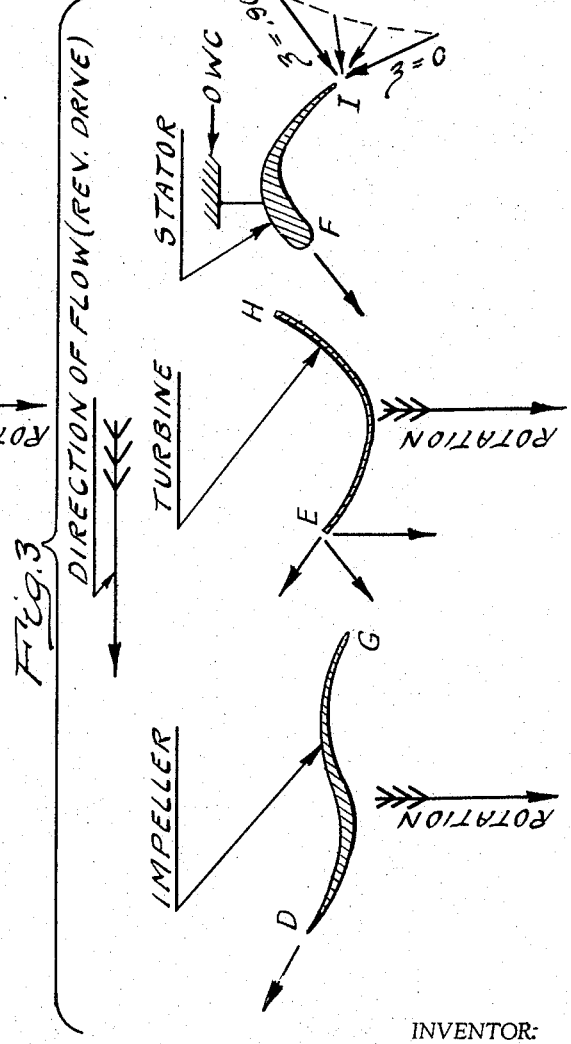

United States Patent Office 3,307,428
Patented Mar. 7, 1967

3,307,428
HYDROKINETIC POWER TRANSMISSION MECHANISM HAVING A REVERSIBLE FLOW CONVERTER
Norman T. General, Walled Lake, Mich., assignor to Ford Motor Company, Dearborn, Mich., a corporation of Delaware
Filed Dec. 30, 1963, Ser. No. 334,302
4 Claims. (Cl. 74—688)

My invention relates generally to hydrokinetic power transmission mechanisms having a hydrokinetic torque converter unit and planetary gear units that provide multiple torque delivery paths for delivering driving torque from a driving member to a driven member in both forward and reverse directions.

In a preferred embodiment of my invention, I have provided a pair of simple planetary gear units having a power input element that is connected to the turbine of a three-element torque converter and a power output element that is connected to a driven member. My invention is adapted to be used especially in drivelines for automotive vehicles wherein the driven member is connected drivably to the vehicle traction wheels. The vehicle engine may be connected to the impeller of the torque converter in the usual fashion. Separate reaction elements of the planetary gear units can be anchored selectively to establish a first low speed driving ratio and an intermediate speed ratio in a forward driving direction. Clutch structure is provided for establishing a direct driving connection between the driving and driven members to produce a mechanical torque delivery path that bypasses the hydrokinetic portions of the system.

During reverse operation the clutch and brake elements of the system are adapted to establish split torque delivery paths between the driving member and the driven member, one path being wholly mechanical and the balance of the torque being distributed hydrokinetically.

During reverse drive operation, the turbine of the hydrokinetic torque converter is overspeeded with respect to the impeller thereby creating a regenerative power flow path that is defined in part by hydrokinetic members of the converter. This results in a reversal in the direction of the toroidal fluid flow in the torus circuit of the converter. It is an object of my invention, therefore, to provide a converter that is capable of being used in a regenerative torque delivery gear system of the type above described and which is capable of establishing torque multiplication hydrokinetically upon a reversal in the direction of the torus flow in the circuit of the converter thereby augmenting the effective reverse torque ratio that can be established by the gear system.

It is another object of my invention to provide a hydrokinetic torque converter having an impeller, a turbine and a stator situated in toroidal fluid flow relationship in a common torus circuit wherein the functions of the impeller and the turbine can be interchanged to provide torque multiplication regardless of the direction of torque delivery through the converter.

It is another object of my invention to provide a hydrokinetic torque converter unit of the type above set forth wherein the geometry of the blading for the bladed members of the hydrokinetic unit is such that a change in the moment of momentum of the fluid traversing the torus circuit of the converter unit is changed by the impeller when the turbine member functions as a power input element. I contemplate that the same blading will be effective to provide a corresponding change in the moment of momentum of the fluid traversing the torus circuit when the impeller functions as a power input element.

For the purpose of describing my invention more particularly, reference will be made to the accompanying drawings, wherein;

FIGURE 1 shows a schematic assembly view of a multiple speed ratio power transmission mechanism embodying my invention, FIGURE 2 shows a portion of a blade cascade diagram that illustrates the blading of a conventional torque converter mechanism, FIGURE 3 is a diagram corresponding to FIGURE 2 but which includes modified blading necessary to establish hydrokinetic torque conversion upon a reversal in the direction of the toroidal fluid flow;

FIGURES 4 and 5 show adjustable stator blades;

FIGURE 6 is a flow vector diagram showing the flow vectors for the fluid flow at the exit sections of the impeller, the turbine and the stator for the conventional blading of FIGURE 2, and FIGURE 7 is a diagram corresponding to FIGURE 6, although it illustrates the reverse flow exit vectors for the blading of FIGURE 3.

Referring first to FIGURE 1, numeral 10 designates generally a hydrokinetic torque converter having a bladed impeller 12, a bladed turbine 14 and a bladed stator 16. The impeller, the turbine and the stator are disposed in toroidal fluid flow relationship in a common torus circuit. The impeller 12 includes an outer shroud 18 which is connected to a clutch drum 20. This drum in turn is connected to a drive plate 22 to which a crankshaft of an internal combustion vehicle engine may be connected.

Impeller 10 includes also an inner shroud 24 and blades 26 which are situated between the shrouds 24 and 18 to define radial flow passages. The turbine 14 includes an outer shroud 28, an inner shroud 30 and turbine blades 32 situated between the shrouds. These blades form radial flow passages that are in juxtaposed fluid flow relationship with respect to the passages of the impeller 12.

Stator 16 includes stator blades 34 and a hub 36 that acts as a stator shroud. Carried within the hub 36 is an overrunning brake outer race 38 that may be cammed to accommodate overrunning brake rollers 40. These rollers engage an inner overrunning brake race 42 which is fixed to a stationary sleeve shaft 44. Shaft 44 in turn is connected directly to a portion of the transmission housing shown in part at 46.

Overrunning brake rollers 40 cooperate with the races to inhibit rotation of the stators 16 in one direction but accommodate freewheeling motion thereof in the opposite direction.

Disposed within sleeve shaft 44 is a turbine sleeve shaft 48 which is connected to the hub 50 of the turbine 14. A central torque delivery shaft 52 is situated within the sleeve shaft 48. It supports a friction clutch disc 54. A damper spring assembly 56 of conventional construction can be used to establish the driving connection between disc 54 and shaft 52.

Disc 54 is situated between adjacent friction discs 58 and 60 which are carried by the clutch drum 20. The discs 54, 58 and 60 can be urged into frictional driving driving relationship by means of a suitable fluid pressure operated servo thereby establishing a direct driving connection between shaft 52 and the engine crankshaft.

A pair of simple planetary gear units is indicated at 62 and 64. Gear unit 62 includes a ring gear 66, a sun gear 68, planet pinions 70 and a carrier 72. Pinions 70 are rotatably journaled upon carrier 72 and they mesh drivably with sun gears 68 and ring gear 66. Gear unit 64 includes a ring gear 75 and a sun gear 74 which may be connected directly to the sun gear 68 by means of a sun gear sleeve 76. In the alternative, the sun gears 68 and 74 can be formed as an integral gear with identical pitch diameters. The ring gears 64 and 66, of course, also may have equal pitch diameters.

Gear unit 64 includes also planet pinions 78 which are journaled upon a carrier 80 and which mesh drivably with ring gear 75 and sun gear 74. Carrier 80 forms a part of a low and reverse brake drum 82 about which is disposed a low and reverse friction brake band 84. It may be applied and released by means of a suitable fluid pressure operated servo in a conventional fashion to anchor selectively the carrier 80.

The sun gears 68 and 74 are connected to a brake drum 86 about which is positioned an intermediate speed ratio friction brake band 88. This band also may be applied and released by means of a suitable fluid pressure operated servo in a conventional fashion.

Ring gear 75 is connected to a forward clutch drum 90 which carries friction clutch discs 92 and 94. Disposed between these discs is a friction clutch disc 96 that is carried by and connected directly to the central shaft 52. Drum 90 in turn is connected directly to the power output shaft shown at 98. Shaft 52 also is connected directly to the carrier 72 as indicated.

To establish the lowest forward driving speed ratio, brake band 84 is applied thereby anchoring carrier 80. Brake band 88 is released and the front clutch shown in part at 54 is released, while the forward clutch shown in part at 96 is applied. The engine powers the impeller 12 in the usual fashion thereby establishing toroidal fluid flow in the torus circuit of the converter. The turbine torque that is developed is transmitted through shaft 48 to the ring gear 66. A portion of the power thus delivered to the gear unit 62 is transmitted to shaft 52 through the carrier 72. It then is transferred through the forward clutch to the power output shaft 98. The balance of the power is distributed from reversely rotating sun gear 68 to sun gear 74. Since carrier 80 is anchored, ring gear 75 is powered in a forward driving direction thus augmenting the power that is delivered to the shaft 98 by the shaft 52.

To establish intermediate speed ratio operation, brake band 88 is applied and brake band 84 is released. The forward clutch shown in part at 96 remains applied and the clutch shown in part at 54 remains released. The turbine torque that is developed then is transferred directly to ring gear 66 while sun gear 68 functions as a reaction member. The resulting carrier torque in carrier 72 is distributed directly to shaft 52 and hence to the shaft 98 through the forward clutch shown in part at 96.

During high speed ratio forward drive operation, both brakes are released and both clutches are applied. Thus a direct driving connection is established between the engine crankshaft and the power output shaft 98. It will be apparent, therefore, that during operation in the forward driving range a dual power delivery path is provided for low speed ratio operation with the hydrokinetic unit forming a portion of each path. During operation in the intermediate speed ratio, a single power flow path is provided and the hydrokinetic unit again forms a part of that path. During operation in the high speed ratio, however, the power flow path is entirely mechanical and the hydrokinetic unit is bypassed.

During reverse drive operation, the brake band 84 is applied, the brake band 88 is released, the forward clutch shown in part at 96 is released and the other friction clutch shown in part at 54 is applied. Torque then is delivered through the clutch shown in part at 54 to the carrier 72. The power then is divided with a portion thereof being delivered from sun gear 68 to sun gear 74. Since carrier 80 acts as a reaction member, ring gear 75 and the power output shaft 98 tend to be driven in a reverse direction. The balance of the power delivered to the carrier 72 is distributed to the ring gear 66 and hence to the turbine 14 through the shaft 48. The turbine 14 then is overspeeded with respect to the impeller 12. This causes a reversal in the direction of the toroidal fluid flow as torque is distributed through the converter unit regeneratively. This regenerative torque is distributed then to the clutch drum 20 and through the engaged clutch shown in part at 54 to the carrier 72.

If it is assumed for the purpose of discussion that both sun gears have thirty-three teeth and both ring gears have sixty-three teeth, the reverse mechanical gear ratio is 2.2 to 1. In many automotive vehicle applications, this reverse ratio would be considered to be too low. It therefore is necessary to augment this mechanical ratio by providing hydrokinetic torque conversion in the torque converter unit 10 during reverse drive as well as during forward drive.

Referring next to FIGURE 2, I have illustrated a blade cascade arrangement showing the blade profiles as they would appear if a section were taken along the mean streamline of each of the blades of a conventional converter and then unwrapped into the plane of FIGURE 2. The flow through the torus circuit in the unwrapped view of FIGURE 2 is illustrated by a vector extending from left to right. The fluid flow entrance vectors relative to the impeller blade at various speed ratios also have been indicated in FIGURE 2. These speed ratios have been designated by the symbol "$\zeta$." As the speed ratio changes, of course, the angles of the vectors change.

The torque ratio at any given speed ratio is obtained by computing the values of the pump torque and the turbine torque. To do this, it is necessary to determine analytically the characteristics of a particle of fluid at the exit sections of the impeller, the turbine and the stator. For this purpose, the vector diagram of FIGURE 6 would be useful. In FIGURE 6, the vector $f_0$ designates torus flow at the exit section of the impeller blades. The vector $w_0$ designates the fluid flow velocity vector along the blade at the exit section of the impeller blade. The vector $u_0$ is a vector that represents the rotational velocity of the impeller blade exit section.

The vector $v_0$ is the vector sum of the other vectors and represents the absolute fluid flow velocity. The tangential component of the absolute fluid flow velocity vector is designated in FIGURE 6 by the symbol $s_0$.

The corresponding vectors for the exit section of the turbine blading also have been indicated in FIGURE 6, although capital notations have been used to differentiate the turbine vector diagram from the impeller vector diagram. The corresponding vectors for the stator have been indicated similarly although primed capital notations have been used. There is no rotational velocity vector, of course, for the stator.

The impeller torque is proportional to the change in the moment of momentum of the fluid that passes through the bladed passages of the impeller. This in turn is equal to the moment of momentum of the fluid that leaves the exit section of the impeller blading less the moment of momentum of the fluid that leaves the exit section of the stator blading.

The moment of momentum of a particle of fluid at any given instant is equal to the mass of that particle of fluid times its operating radius times the tangential component of the absolute fluid flow velocity vector for that particle. In FIGURE 6, the quantity $s_0$ is larger than the quantity $S_0'$. Thus there is an increase in the tangential component of the absolute fluid flow velocity vector as the fluid passes through the impeller. Furthermore, the operating radius obviously is increased as the fluid traverses the bladed passages of the impeller. For this reason, the moment of momentum of the fluid is increased substantially by the impeller.

The magnitude of the quantity $S_0$, of course, will change as the speed ratio changes. But in the particular case illustrated in FIGURE 6, the quantity $S_0$ is substantially less than the quantity $s_0'$. Furthermore, the operating radius of a particle of fluid as it leaves the exit section of the turbine is substantially less than the operating radius of a corresponding particle of fluid as it enters the entrance region of the turbine blading. It is apparent, therefore, that the moment of momentum of the fluid is substantially decreased as it passes through the bladed passages of the turbine. This results in a turbine torque that is distributed to the gear ring as explained previously.

To provide an augmentation in the turbine torque, the stator redirects the fluid flow to provide a favorable flow entrance angle at the entrance region of the impeller. The stator outlet vector has been illustrated in FIGURE 2 at the entrance region of the impeller to show the relative angularity of the stator outlet flow vector and the angularity of the blade itself.

Referring next to FIGURE 3, I have illustrated the blading that would be used in one embodiment of my invention. In this instance the fluid flow traverses the torus circuit in the direction of the directional arrow in FIGURE 7 during reverse drive operation. During forward drive operation, however, the flow is from left to right, as in the case of FIGURE 6.

During reverse drive operation, the stator exit section becomes a so-called stator entrance section. The entrance angles of the fluid flow velocity vector flow relative to the stator blades have been designated in FIGURE 3. As the speed ratio $\zeta$ changes, the angularity of the vectors, of course, changes accordingly.

In order to provide a torque augmentation, it is necessary for the stator to change the direction of the absolute fluid flow velocity vector. This can be done more effectively if the stator blading is formed in two parts or by providing stator blading with a variable pitch. These characteristics are illustrated in the blade diagrams of FIGURES 4 and 5.

During operation in reverse, the angularity of the stator blading can be increased by adjusting the blade section 100 relative to the blade section 102 to the reverse position illustrated by means of full lines. The dotted line position of the section 100 shown in FIGURE 4 illustrates the normal forward drive position. Thus the angularity of the absolute fluid flow velocity vector can be changed substantially more for greater torque ratio augmentation in those instances when the turbine functions as an impeller.

In FIGURE 7, I have illustrated the vector diagrams for particles of fluid at the trailing edge portions of the various bladed sections during reverse flow operation of the converter. The symbols used in FIGURE 7 correspond to symbols used in FIGURE 6, although a subscript "R" has been added to designate reverse flow conditions.

The points on the edges of the blades in the diagrams of FIGURES 6 and 7 at which the flow vectors are computed have been identified by reference symbols A, B, C, D, E and F. The corresponding points on the blades themselves as seen in FIGURES 2 and 3 have been designated by corresponding symbols.

In addition, applicant has identified the right-hand edges of the blades shown in FIGURE 3 by the reference symbols G, H and I. The flow vectors at these edges correspond generally to the flow vectors illustrated in FIGURE 6 for the edges A, B and C, respectively. For this reason the flow vectors for edges G, E and I have not been repeated here. For example, the flow vectors for edge A in FIGURE 6 represent also generally the flow vectors for edge G. Similarly, the flow vectors for edge B in FIGURE 6 correspond generally to the flow vectors for edge H, and the flow vectors for edge C in FIGURE 6 correspond generally to the flow vectors for edge I. This correlation exists, of course, only when the direction of flow for the blading of FIGURE 3 is in the direction of the arrow shown in FIGURE 6. This correlation does not exist, however, when the direction of flow for the blading of FIGURE 3 is in the direction of the arrow shown in FIGURE 3.

A decrease in the angle $\Gamma_{or}'$ will result in an increase in the length of the absolute fluid flow velocity vector $S_{or}'$. This in turn will result in an increase in the moment of momentum of the fluid that leaves the exit section of the turbine, which in this instance functions as an impeller. But for any given impeller torque the difference between the moment of momentum of the fluid leaving the blades 32 and the moment of momentum of the fluid leaving the stator blades will be less. This, of course, means that the torque ratio will be increased.

It will be observed also that the angle $\gamma_r$ in FIGURE 7 is substantially larger than the corresponding angle $\gamma$ in FIGURE 6. Because of this reversal in the direction of the blading, a more favorable effective impeller outlet vector angle is made available to the stator before the flow enters the bladed passages of the stator.

The blades 26 have been shown with a so-called S shape in FIGURE 3 in order to make it possible to reduce the length of the blades. When the blades 26 are developed in an unwrapped torus blade cascade, the blading will then assume the shape shown in FIGURE 3.

I contemplate that a single stator blade of the unitary type may be employed, although the variable pitch version or the split blade version of FIGURES 4 and 5 would provide greater torque ratio augmentation. If the split blade version of FIGURE 4 is employed, it obviously would be necessary to employ two overrunning brakes in the manner described with reference to FIGURE 1. These brakes would correspond in function to the overrunning brakes shown in part at 40 in FIGURE 1.

Having thus described preferred embodiments of my invention, what I claim and desire to secure by United States Letters Patent is:

1. A hydrokinetic torque converter mechanism having a bladed impeller, a bladed turbine and a bladed stator disposed in toroidal fluid flow relationship in a common torus circuit, a driving member, said impeller being connected to said driving member, torque delivery gearing having plural torque delivery elements, a driven member, said turbine being connected to a first one of said gearing elements, brake means for anchoring a second one of said gearing elements to provide torque reaction, selectively engageable clutch means for connecting said impeller to a third one of said gearing elements, the toroidal fluid flow passing in one direction from the flow exit section of the impeller to the flow entrance section of the turbine when said clutch means is released and said first gearing element functions as a power input element for said gearing and said third gearing element functions as a power output element, the latter being connected to said driven member, the fluid flow passing in the opposite direction when said third gearing element functions as a power input element and said first gearing element functions as a power output element upon engagement of said clutch means, said stator including flow directing blades disposed between the flow exit region of said turbine and the flow entrance region of said impeller when the flow is in said one direction, overrunning brake means for anchoring said stator against forward rotation in a direction opposite to the direction of rotation of said turbine and impeller but permitting free-wheeling motion thereof in the backward direction, the geometry of the blading of said stator being such that the moment of momentum of the fluid in said circuit is changed as the fluid passes through the stator blading in each direction of flow thereby providing hydrokinetic torque conversion regardless of the direction of torque delivery through said gearing elements, said turbine being overspeeded with respect to said impeller when said brake means is applied as the turbine and the impeller rotate in a common direction, the impeller being overspeeded with respect to said turbine in a common direction when said brake means is released, the toroidal fluid flow in said torus circuit being in said one direction when said impeller overspeeds said turbine and being in said opposite direction when said turbine overspeeds said impeller, the angle ($\gamma_r$) formed by the impeller flow exit section blading during fluid flow in said opposite direction being greater than 90° but less than 180° when the said angle ($\gamma_r$) is measured between two intersecting velocity vectors with the point of intersection being a point at said impeller exit section, one of said two vectors extending from said point of intersection in the tangential direction of rotation of said impeller and the other of said two vectors being tangent to said impeller flow exit section blading and extending from said point of intersection in said opposite direction of fluid flow, the angle ($\gamma$) formed by the impeller flow exit section blading during fluid flow in said one direction being less than 90° but greater than 0° when the said angle ($\gamma$) is measured between two intersecting velocity vectors with the point of intersection being a point at said impeller exit section during fluid flow in said one direction, one of said last-named two vectors extending in the tangential direction of rotation of said impeller and the other of said last-named two vectors being tangent to the blading of said impeller exit section during fluid flow in said one direction and extending in said one direction of fluid flow.

2. The combination as set forth in claim 1 wherein the blading of said impeller has blade elements characterized by an S shape when they are unwrapped from the torus circuit and projected on a reference plane that is perpendicular to the geometric axis of said torus circuit.

3. The combination as set forth in claim 1 wherein said stator incorporates two bladed sections, the pitch of one bladed section being adjustable relative to the other bladed section, the adjustable bladed section being disposed on the upstream side of the other bladed stator section when the fluid flow in said torus circuit is in said one direction.

4. The combination as set forth in claim 2 wherein said stator incorporates two bladed sections, the pitch of one bladed section being adjustable relative to the other bladed section, the adjustable bladed section being disposed on the upstream side of the other bladed stator section when the fluid flow in said torus circuit is in said one direction.

References Cited by the Examiner
UNITED STATES PATENTS

| | | | |
|---|---|---|---|
| 2,292,482 | 8/1942 | Roche. | |
| 2,749,773 | 6/1956 | Simpson | 74—763 |
| 2,855,803 | 10/1958 | Knowles | 74—688 |
| 2,909,034 | 10/1959 | Jandasek | 60—54 |
| 2,929,214 | 3/1960 | Stump et al. | 60—54 |
| 3,150,542 | 9/1964 | Baker | 74—688 |

DAVID J. WILLIAMOWSKY, *Primary Examiner.*

THOMAS C. PERRY, *Examiner.*